US009778665B2

(12) United States Patent
Sugiyama et al.

(10) Patent No.: US 9,778,665 B2
(45) Date of Patent: Oct. 3, 2017

(54) AIR-CONDITIONING APPARATUS

(71) Applicant: Mitsubishi Electric Corporation, Tokyo (JP)

(72) Inventors: Daisuke Sugiyama, Tokyo (JP); Hirokazu Iijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 568 days.

(21) Appl. No.: 14/456,201

(22) Filed: Aug. 11, 2014

(65) Prior Publication Data

US 2015/0066218 A1 Mar. 5, 2015

(30) Foreign Application Priority Data

Sep. 4, 2013 (JP) .................................. 2013-183271

(51) Int. Cl.
G01M 1/38 (2006.01)
G05D 23/19 (2006.01)
F24F 11/00 (2006.01)

(52) U.S. Cl.
CPC ........ *G05D 23/1905* (2013.01); *F24F 11/006* (2013.01); *F24F 11/0086* (2013.01);
(Continued)

(58) Field of Classification Search
CPC .................................................. G05D 23/1905
(Continued)

(56) References Cited

U.S. PATENT DOCUMENTS 4,829,779 A * 5/1989 Munson ............... F24F 11/0009
236/51
4,885,766 A * 12/1989 Yasuoka .............. H04M 11/007
340/12.3
(Continued)

FOREIGN PATENT DOCUMENTS

JP S57-067740 A 4/1982
JP 2003-120984 A 4/2003
(Continued)

OTHER PUBLICATIONS

Khiyal, Malik Sikandar Hayat, Aihab Khan, and Erum Shehzadi. "SMS based wireless home appliance control system (HACS) for automating appliances and security." Issues in Informing Science and Information Technology 6 (2009): pp. 887-894.*
(Continued)

*Primary Examiner* — Satish Rampuria
(74) *Attorney, Agent, or Firm* — Posz Law Group, PLC

(57) ABSTRACT

An air-conditioning apparatus includes a receiving unit configured to receive remote control information transmitted from a remote control device, an adapter configured to receive remote information including operation details conveyed through an external network, an information outputting unit configured to output information when the adapter receives the remote information or when the receiving unit receives the remote control information, and a controller configured to control operations of the information outputting unit. The controller includes an information adjustment unit configured to cause the information outputting unit to output different information when the adapter receives the remote information and when the receiving unit receives the remote control information.

11 Claims, 4 Drawing Sheets

(52) U.S. Cl.
CPC .............. *F24F 2011/0061* (2013.01); *F24F 2011/0068* (2013.01); *F24F 2011/0091* (2013.01)

(58) Field of Classification Search
USPC .................................................. 700/275–285
See application file for complete search history.

(56) References Cited

U.S. PATENT DOCUMENTS

| | | | | |
|---|---|---|---|---|
| 5,113,665 | A * | 5/1992 | Katsuki | F24F 11/006 236/51 |
| 7,225,054 | B2 * | 5/2007 | Amundson | G05D 23/1902 700/17 |
| 2004/0117069 | A1 * | 6/2004 | Yoon | F24F 11/006 700/276 |
| 2011/0112692 | A1 * | 5/2011 | Chan | F24F 11/006 700/276 |
| 2013/0066474 | A1 * | 3/2013 | Coogan | F24F 11/0012 700/278 |

FOREIGN PATENT DOCUMENTS

| | | |
|---|---|---|
| JP | 2007-024420 A | 2/2007 |
| JP | 2007-040644 A | 2/2007 |
| JP | 2007-240067 A | 9/2007 |

OTHER PUBLICATIONS

Mowad, Mohamed Abd Ei-Latif, Ahmed Fathy, and Ahmed Hafez. "Smart home automated control system using android application and microcontroller." International Journal of Scientific & Engineering Research 5.5 (2014): pp. 935-939.*
Park, In Gyu. "The remote control system for the next generation air conditioners." IEEE Transactions on Consumer Electronics 47.1 (2001): pp. 168-178.*
Office Action mailed Feb. 9, 2016 issued in corresponding JP patent application No. 2013-183271 (and English translation).
Office Action issued Sep. 2, 2016 in the corresponding CN application No. 201410447615.9 (with English translation).
Extended European Search Report issued Feb. 4, 2015 in the corresponding EP Application No. 14180397.3.

* cited by examiner

| TIME | TIMER ACTION | AUTOMATIC ACTION | NORMAL ACTION |
|---|---|---|---|
| 0:00～5:59 | × | × | ○ |
| 6:00～11:59 | ○ | × | ○ |
| 12:00～17:59 | ○ | × | ○ |
| 18:00～23:59 | ○ | × | ○ |

○ : EMITTING RECEPTION SOUND IS ALLOWED  × : EMITTING RECEPTION SOUND IS NOT ALLOWED

AIR-CONDITIONING APPARATUS

CROSS-REFERENCE TO RELATED APPLICATIONS

Pursuant to 35 U.S.C. §119(a), this application claims the benefit of earlier filing date and right of priority to Japanese Application No. 2013-183271, filed on Sep. 4, 2013, the contents of which are all hereby incorporated by reference herein in its entirety.

TECHNICAL FIELD

The present invention relates to an air-conditioning apparatus including a controller.

BACKGROUND ART

Air-conditioning apparatuses whose operation details are changed by a remote manipulation instruction from outside home, in addition to a manipulation instruction through a remote control device, has previously been proposed. However, if any remote manipulation instruction from outside home is accepted, for example, when a person present in a room where the air-conditioning apparatus is disposed, an operation not intended for him or her may be performed. As a technique that aims to address this issue, an air-conditioning apparatus is disclosed in Patent Literature 1. When an instruction to change operation details is issued by remote manipulation from outside home, the air-conditioning apparatus determines whether the instruction is to be allowed depending on the instructed operation details. The air-conditioning apparatus disclosed in Patent Literature 1 aims to reduce the occurrence of shifts to an operation that would seriously affect a user in a room and that would not be intended for him or her by restricting acceptance of a remote manipulation instruction.

CITATION LIST

Patent Literature

[Patent Literature 1] Japanese Unexamined Patent Application Publication No. 2007-24420 (pages 3 to 5)

SUMMARY OF INVENTION

Technical Problem

The air-conditioning apparatus disclosed in Patent Literature 1 performs an operation based on a remote manipulation instruction without informing a user in a room when the instructed details are allowed. For example, when a remote manipulation instruction is received from outside home without a user in a room being aware of it, an operation that would affect him or her may be performed. If the user is in contact with a movable part in the inactive air-conditioning apparatus, when a remote manipulation instruction is received from outside home, the movable part may move abruptly and that movement may affect him or her. As described above, the air-conditioning apparatus disclosed in Patent Literature 1 has an issue in that a remote manipulation instruction from outside home is more unexpected to a user than an instruction through a remote control device, whose receivable range is limited and which is mainly used inside a room.

In light of the above problems, the present invention provides an air-conditioning apparatus capable of enabling a user to identify that a received instruction arises from a remote manipulation when the instruction is a remote manipulation instruction received from outside home, such as the one to start an operation or to change operation details.

Solution to Problem

An air-conditioning apparatus according to the present invention includes a receiving unit configured to receive remote control information transmitted from a remote control device, an adapter configured to receive remote information including operation details conveyed through an external network, an information outputting unit configured to output information when the adapter receives the remote information or when the receiving unit receives the remote control information, and a controller configured to control operations of the information outputting unit. The controller includes an information adjustment unit configured to cause the information outputting unit to output different information when the adapter receives the remote information and when the receiving unit receives the remote control information.

Advantageous Effects of Invention

In accordance with the present invention, because the information outputting unit outputs different information when remote information is received and when remote control information is received, the user can immediately identify reception of the remote information.

DESCRIPTION OF EMBODIMENTS

Figure 1:
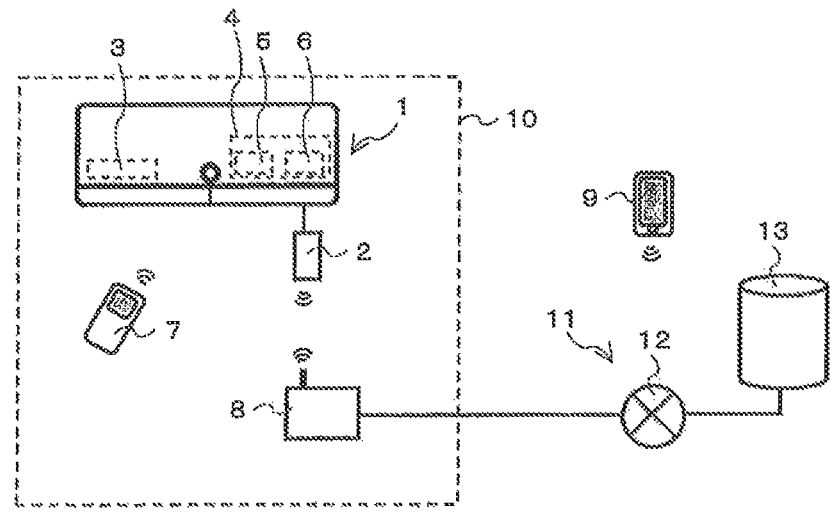
FIG. 1 is a schematic diagram that illustrates an air-conditioning apparatus 1 according to Embodiment 1.

Embodiments according to the present invention will be described below with reference to the drawings. Embodiments described below are not intended to limit the present invention. The relationships between the sizes of components in the drawings, including FIG. 1, may differ from the real ones.

Embodiment 1

FIG. 1 is a schematic diagram that illustrates an air-conditioning apparatus 1 according to Embodiment 1. The air-conditioning apparatus 1 is described in reference to FIG. 1. As illustrated in FIG. 1, the air-conditioning apparatus 1 can be installed in a house 10, for example, and includes a receiving unit 3 configured to receive remote control information from a remote control device 7 accompanying the air-conditioning apparatus 1 and an information outputting unit 4. The information outputting unit 4 is configured to output information and can include a sound producing unit 5 configured to produce a sound and a display unit 6 configured to provide a predetermined indication, for example. In accordance with operation details included in received remote control information, the sound producing unit 5 may produce a sound or the display unit 6 may display the operation details.

The air-conditioning apparatus 1 is provided with an adapter 2 configured to receive remote information. The remote information differs from the remote control information. In addition to the air-conditioning apparatus 1, a router 8 is disposed inside the house 10. The router 8 is configured to transmit information received via an external network 11 to the adapter 2.

Next, the external network 11 is described. An example of the external network 11 can be an Internet network 12 connected on the external network 11. The Internet network 12 is connected to a remote control centralized management device 13, such as a server. When a manipulation instruction for the air-conditioning apparatus 1 is issued from outside home using, for example, a portable manipulation terminal 9, the operation details associated with that manipulation instruction are sent through the Internet network 12 and temporarily stored in the remote control centralized management device 13. The remote control centralized management device 13 and the air-conditioning apparatus 1 can exchange information with each other at any time. For example, the air-conditioning apparatus 1 transmits information regarding the air-conditioning apparatus 1 from the adapter 2 to the remote control centralized management device 13 through the router 8 and the Internet network 12. In response to that transmission, the remote control centralized management device 13 transmits information stored in the remote control centralized management device 13 to the air-conditioning apparatus 1 through the Internet network 12 and the router 8.

When a manipulation instruction from the portable manipulation terminal 9 is stored in the remote control centralized management device 13, remote information associated with the manipulation instruction is transmitted from the remote control centralized management device 13 to the air-conditioning apparatus 1. In accordance with the operation details included in the remote information, an operation may be started or operation mode, such as cooling or heating, may be changed, and additionally, the sound producing unit 5 may produce a sound or the display unit 6 may display the operation details.

Figure 2:
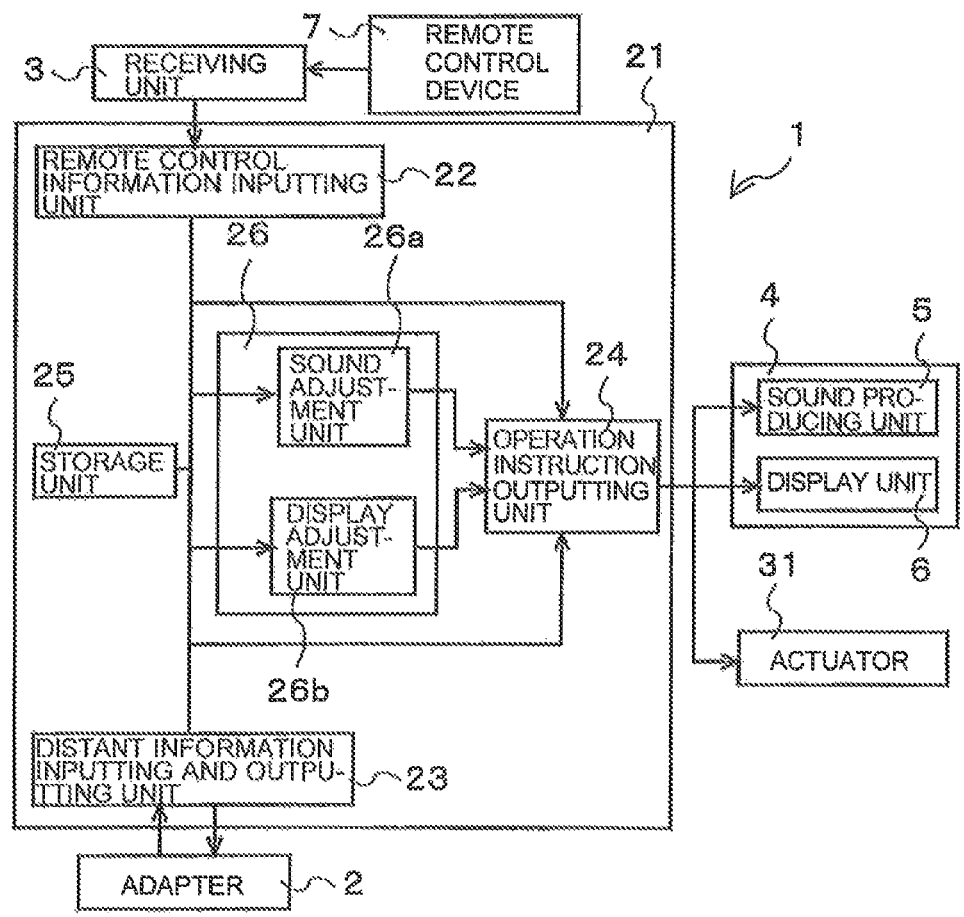
FIG. 2 is a block diagram that illustrates the air-conditioning apparatus 1 according to Embodiment 1.

Next, a controller 21 is described. FIG. 2 is a block diagram that illustrates the air-conditioning apparatus 1 according to Embodiment 1. The air-conditioning apparatus 1 includes the controller 21. As illustrated in FIG. 2, the controller 21 includes a remote control information inputting unit 22, a remote information inputting and outputting unit 23, a storage unit 25, an information adjustment unit 26, and an operation instruction outputting unit 24. The remote control information inputting unit 22 is configured to receive remote control information through the receiving unit 3 from the remote control device 7 and process thereof. The remote information inputting and outputting unit 23 is configured to receive remote information through the adapter 2 from the remote control centralized management device 13 and process thereof. In addition to that, the remote information inputting and outputting unit 23 is configured to output information about the air-conditioning apparatus 1 to the adapter 2.

The storage unit 25 stores various kinds of control setting values, problems, and other elements. In the controller 21, control setting values, programs, or other elements based on remote control information or remote information are read from the storage unit 25, and these items are transmitted to the information adjustment unit 26 or the operation instruction outputting unit 24. In the controller 21, a signal is received through the remote control information inputting unit 22, which processes the remote control information, and a signal is received through the remote information inputting and outputting unit 23, which processes the remote information, and these signals are subjected to computing and determination.

The information adjustment unit 26 is configured to cause the information outputting unit 4 to output different information when remote information is received and when remote control information is received. The information adjustment unit 26 includes a sound adjustment unit 26a and a display adjustment unit 26b. The sound adjustment unit 26a is configured to cause the sound producing unit 5 to produce different sounds when remote information is received and when remote control information is received. The display adjustment unit 26b is configured to cause the display unit 6 to provide different indications when remote information is received and when remote control information is received.

The operation instruction outputting unit 24 is configured to receive information from the sound adjustment unit 26a or the display adjustment unit 26b and output an operation instruction to the sound producing unit 5, the display unit 6, or an actuator 31 included in the air-conditioning apparatus 1. The actuator 31 is configured to cause a movable part or other parts in the air-conditioning apparatus 1 to operate.

Figure 3:
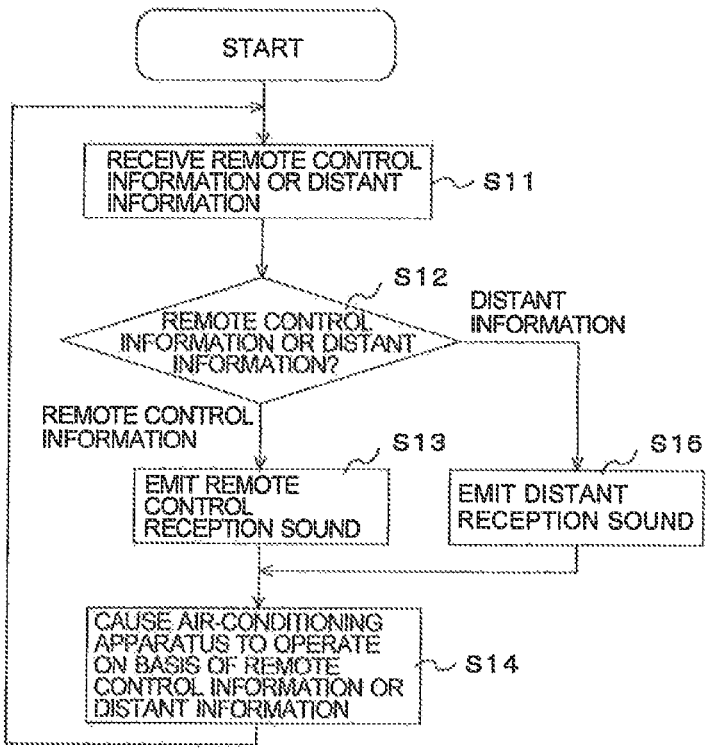
FIG. 3 is a flowchart that illustrates operations of the air-conditioning apparatus 1 according to Embodiment 1.

Next, operations of the air-conditioning apparatus 1 according to Embodiment 1 are described. In Embodiment 1, an operation of distinguishing between remote control information and remote information by the sound adjustment unit 26a is described. FIG. 3 is a flowchart that illustrates the operations of the air-conditioning apparatus 1 according to Embodiment 1. As illustrated in FIG. 3, the air-conditioning apparatus 1 first receives remote control information or remote information (step S11). Then, the sound adjustment unit 26a determines whether the received information is the remote control information or the remote information (step S12). When the sound adjustment unit 26a determines that the received information is the remote control information, the sound adjustment unit 26a causes the sound producing unit 5 to emit a remote control reception sound, which is the sound occurring when a manipulation instruction is issued using a remote control device (step S13). The air-conditioning apparatus 1 operates on the basis of the operation details included in the remote control information (step S14).

When the sound adjustment unit 26a determines at step 612 that the received information is the remote information, the sound adjustment unit 26a causes the sound producing unit 5 to emit a remote reception sound, which is the sound occurring when a remote manipulation instruction is issued (step S15). Processing then proceeds to step S14, and the air-conditioning apparatus 1 operates on the basis of the operation details included in the remote information.

As described above, in Embodiment 1, different reception sounds are emitted for a manipulation through the remote control device 7 and for a remote manipulation from outside home. Thus when remote information is received, a user can immediately identify it, and the occurrence of changes in an operation state without the user being aware of them can be reduced. Each of the reception sounds may be music, voice, or other kinds of sounds.

Embodiment 2

Figure 4:
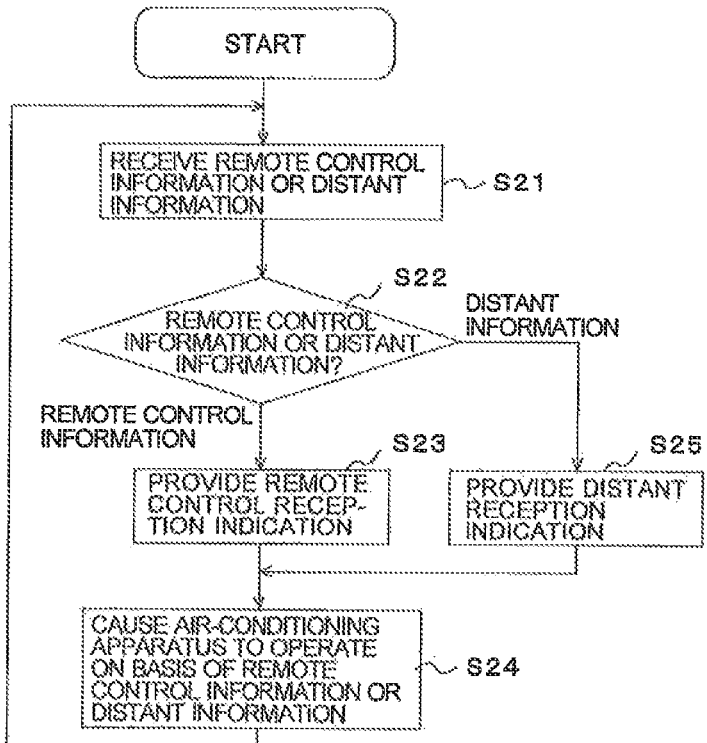
FIG. 4 is a flowchart that illustrates operations of the air-conditioning apparatus 1 according to Embodiment 2.

Next, the air-conditioning apparatus 1 according to Embodiment 2 is described. FIG. 4 is a flowchart that illustrates operations of the air-conditioning apparatus 1 according to Embodiment 2. Embodiment 2 differs from Embodiment 1 in that not the sound adjustment unit 26a but the display adjustment unit 26b distinguishes between remote control information and remote information. The configuration of the air-conditioning apparatus 1 in Embodiment 2 is substantially the same as that in Embodiment 1. In Embodiment 2, the portions common to Embodiment 1 are illustrated with common references and are not described. The description focuses on the differences from Embodiment 1.

In Embodiment 2, as illustrated in FIG. 4, the air-conditioning apparatus 1 first receives remote control information or remote information (step S21). Then, the display adjustment unit 26b determines whether the received information is the remote control information or the remote information (step S22). When the display adjustment unit 26b determines that the received information is the remote control information, the display adjustment unit 26b causes the display unit 6 to provide a remote control reception indication, which is the indication occurring when a manipulation instruction is issued using a remote control device (step S23). The air-conditioning apparatus 1 operates on the basis of the operation details included in the remote control information (step S24).

When the display adjustment unit 26b determines at step S22 that the received information is the remote information, the display adjustment unit 26b causes the display unit 6 to provide a remote reception indication, which is the indication occurring when a remote manipulation instruction is issued (step S25). Processing then proceeds to step S24, and the air-conditioning apparatus 1 operates on the basis of the operation details included in the remote information.

As described above, in Embodiment 2, the display unit 6 provides different reception indications for a manipulation through the remote control device 7 and for a remote manipulation from outside home. Thus, as in the case of Embodiment 1, when remote information is received, a user can immediately identify it, and the occurrence of changes in an operation state without the user being aware of them can be reduced. Each of the reception indications may be an indication using a light-emitting diode (LED) lamp, a character indication using full segments, or other kinds of indications. The air-conditioning apparatus 1 may notify the user using both the sound producing unit 5 and the display unit 6.

Embodiment 3

Figures 5, 6:
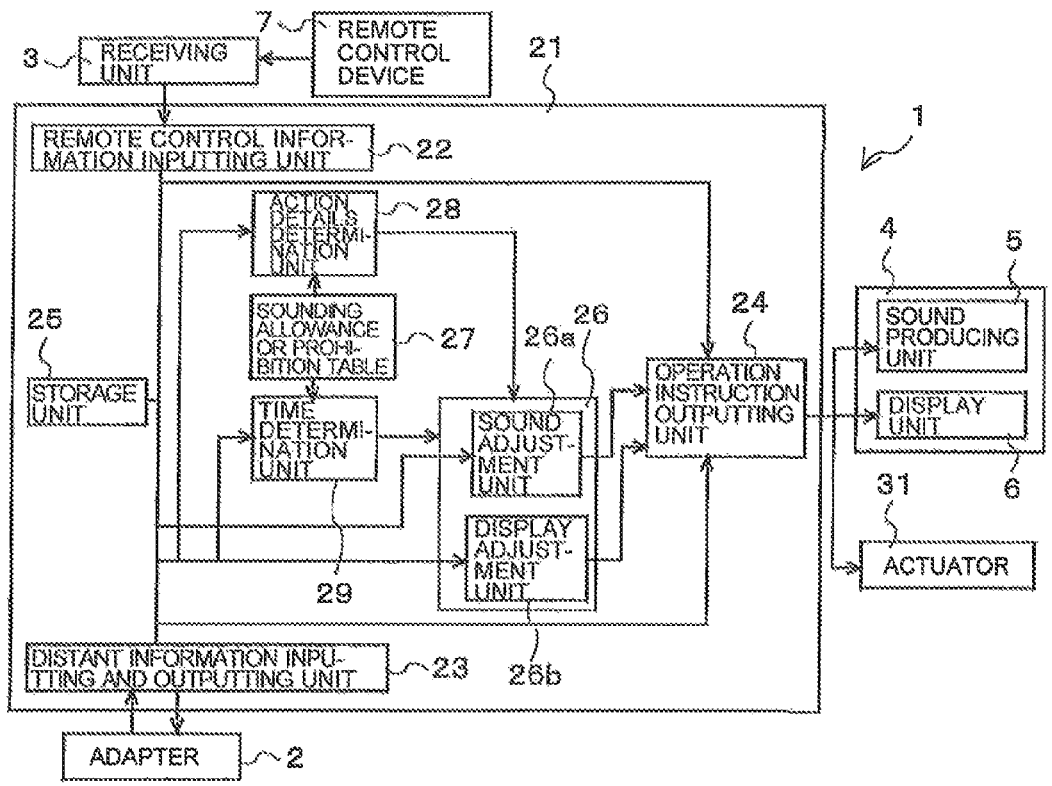
FIG. 5 is a block diagram that illustrates the air-conditioning apparatus 1 according to Embodiment 3.
FIG. 6 illustrates a sounding allowance or prohibition table 27 in Embodiment 3.

Next, the air-conditioning apparatus 1 according to Embodiment 3 is described. FIG. 5 is a block diagram that illustrates the air-conditioning apparatus 1 according to Embodiment 3. Embodiment 3 differs from Embodiment 1 in that the controller 21 includes an operation details determination unit 28 and a time determination unit 29. In Embodiment 3, the portions common to Embodiment 1 are illustrated with common references and are not described. The description focuses on the differences from Embodiment 1.

As illustrated in FIG. 5, the controller 21 includes the operation details determination unit 28, the time determination unit 29, and a sounding allowance or prohibition table 27. The operation details determination unit 28 is configured to determine whether the information outputting unit 4 is caused to output information on the basis of operation details in remote information. Examples of the operation details may include a timer operation, an automatic operation, and a normal operation. The timer operation is an operation in which an operation start time or an operation end time is specified. An example of the automatic operation may be the one in which the air-conditioning apparatus 1 performs an operation while the power consumption inside the house 10 is automatically controlled by a centralized controller through which the air-conditioning apparatus 1 and electric equipment other than the air-conditioning apparatus 1 in the house 10 are connected. An example of the normal operation may be an instruction to change an operation when the air-conditioning apparatus 1 normally acts.

The time determination unit 29 is configured to determine whether the information outputting unit 4 is caused to output information on the basis of a time of receipt of remote information by the adapter 2. The times may be classified in, for example, four time periods consisting of 0:00 to 5:59 (late night), 6:00 to 11:59 (morning), 12:00 to 17:59 (daytime), and 18:00 to 23:59 (night).

Next, the sounding allowance or prohibition table 27 is described. FIG. 6 illustrates the sounding allowance or prohibition table 27 in Embodiment 3. The sounding allowance or prohibition table 27 illustrates one example of relationships among the operation details, times, and presence or absence of information output. The sound producing unit 5 is used in the information output. As illustrated in FIG. 6, for example, when a remote manipulation instruction to perform a timer operation is issued at 3:00, if the reception sound is emitted, it would be unpleasant to the user, who is probably asleep. Thus in such a case, the operation details determination unit 28 and the time determination unit 29 prohibit sounding. In the time periods other than the late time period including 3:00 (0:00 to 5:59), if the reception sound is emitted, it would not be unpleasant to the user, who is probably awake. Thus in these time periods, the operation details determination unit 28 and the time determination unit 29 allow sounding.

In contrast to this, in automatic operation, which is automatically controlled by the centralized controller, the operation may be changed successively. At this time, if the reception sound is emitted on each occasion, it would annoy the user. Thus in all the time periods, the operation details determination unit 28 and the time determination unit 29 do not allow sounding. For normal operation, in all the time periods, the operation details determination unit 28 and the time determination unit 29 allow sounding.

Figure 7:
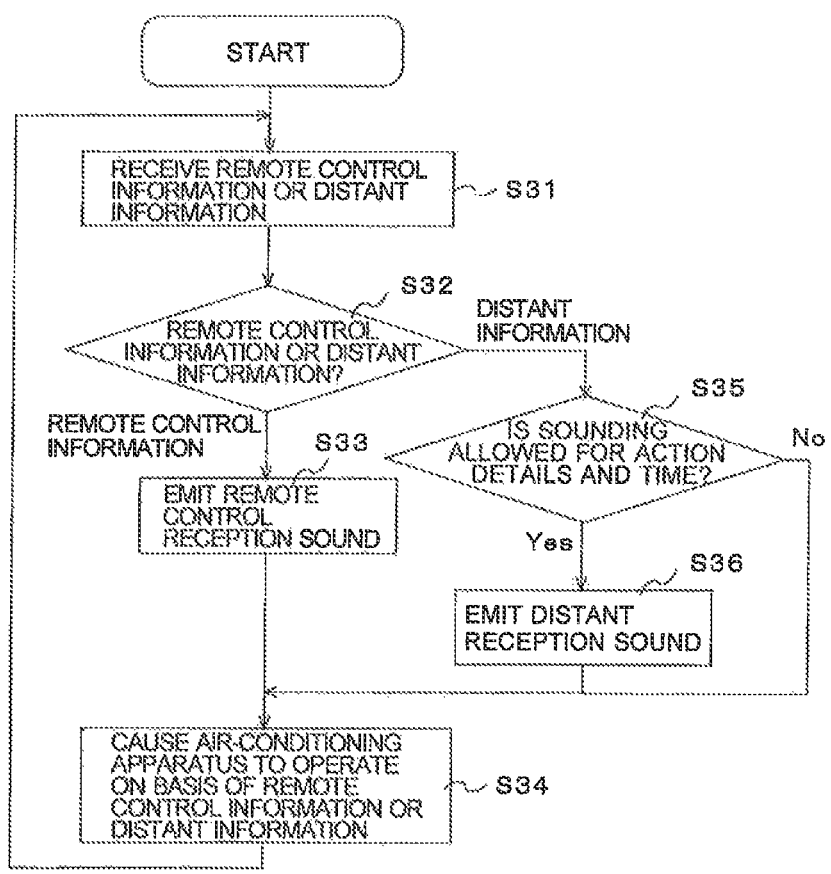
FIG. 7 is a flowchart that illustrates operations of the air-conditioning apparatus 1 according to Embodiment 3.

Next, operations of the air-conditioning apparatus 1 according to Embodiment 3 are described. In Embodiment 3, an operation of distinguishing between remote control information and remote information by the sound adjustment unit 26a is described. FIG. 7 is a flowchart that illustrates the operations of the air-conditioning apparatus 1 according to Embodiment 3. As illustrated in FIG. 7, the air-conditioning apparatus 1 first receives remote control information or remote information (step S31). Then, the sound adjustment unit 26a determines whether the received information is the remote control information or the remote information (step S32). When the sound adjustment unit 26a determines that the received information is the remote control information, the sound adjustment unit 26a causes the sound producing unit 5 to emit a remote control reception sound, which is the sound occurring when a manipulation instruction is issued using a remote control device (step S33). The air-conditioning apparatus 1 operates on the basis of the operation details included in the remote control information (step S34). The operations described up to here are the same as in Embodiment 1.

When the sound adjustment unit 26a determines at step S32 that the received information is remote information, the operation details determination unit 28 and the time determination unit 29 determine on the basis of the sounding allowance or prohibition table 27 whether sounding is allowed for the operation details and the time (step S35). When the operation details determination unit 28 and the time determination unit 29 determine that sounding is allowed for the operation details and the time (YES at step S35), the sound adjustment unit 26a causes the sound producing unit 5 to emit a remote reception sound, which is the reception sound occurring when a remote manipulation instruction is issued (step S36). Then, processing proceeds to step 334, and the air-conditioning apparatus 1 operates on the basis of the operation details included in the remote information. In contrast to this, when the operation details determination unit 28 and the time determination unit 29 determine at step S35 that sounding is not allowed for the operation details and the time (NO at step S35), processing proceeds directly to step S34, and the air-conditioning apparatus 1 operates on the basis of the operation details included in the remote information.

As described above, in Embodiment 3, as in the case of Embodiment 1, different reception sounds are emitted for a manipulation through the remote control device 7 and for a remote manipulation from outside home. Thus when remote information is received, a user can immediately identify it, and the occurrence of changes in an operation state without the user being aware of them can be reduced. Moreover, because emitting the reception sound is restricted in a time period when the user is likely to be asleep, such as the late night time period, the occurrence of annoying the user can be reduced.

When the entire power consumption in the house 10 is automatically controlled by the centralized controller through which the air-conditioning apparatus 1 and other electric equipment in the house 10 are connected, the operation details may be changed intermittently. Emitting the reception sounds is restricted also in such a case. Thus frequently emitting the reception sound can be reduced. Each of the reception sounds may be tunes, voice, or other kinds of sounds. The notification may be made using not the reception sound but an indication on the display unit 6, as in Embodiment 2.

Embodiments of the present invention are not limited to Embodiments 1 to 3 above. For example, when remote information is received and when remote control information is received, different timings of actuation of a wind direction control plate and an air-sending fan in the air-conditioning apparatus 1 may be used, in place of emitting the reception sound and providing the indication on the display unit 6. Specifically, the timing of actuation of the wind direction control plate and the air-sending fan when remote information is received is delayed relative to that when remote control information is received. Thus even if the user or the like is in contact with the wind direction control plate and the air-sending fan in the air-conditioning apparatus 1, abrupt movement of the wind direction control plate and the air-sending fan can be suppressed.

REFERENCE SIGNS LIST 1 air-conditioning apparatus, 2 adapter, 3 receiving unit, 4 information outputting unit, 5 sound producing unit, 6 display unit, 7 remote control device, 8 router, 9 portable manipulation terminal, 10 house, 11 external network, 12 Internet network, 13 remote control centralized management device, 21 controller, 22 remote control information inputting unit, 23 remote information inputting and outputting unit, 24 operation instruction outputting unit, 25 storage unit, 26 information adjustment unit, 26a sound adjustment unit, 26b display adjustment unit, 27 sounding allowance or prohibition table, 28 operation details determination unit, 29 time determination unit, 31 actuator.

The invention claimed is:

1. An air-conditioning apparatus comprising:
 a receiving unit, receiving remote control information transmitted from a remote control device, wherein a range of the remote control device is limited to a room, wherein the remote control information includes operation details for manipulation of the air-conditioning apparatus;
 an adapter, receiving remote information including operation details for the manipulation of the air-conditioning apparatus, wherein the remote information is conveyed to the adapter through an external network;
 an information outputting unit, outputting information (i) when the adapter receives the remote information and (ii) when the receiving unit receives the remote control information; and
 a controller, controlling operations of the information outputting unit,
 wherein the controller includes an information adjustment unit configured to:
  determine whether the operation details are from the remote information or from the remote control information; and
  cause the information outputting unit to output:
   (i) a first indication indicating that the manipulation is from the adapter received via the external network, responsive to the operation details being determined to be from the remote information, and
   (ii) a second indication indicating that the manipulation is from the remote control information through the remote control device, responsive to the operation details being determined to be from the remote control information,
  wherein the first indication is different from the second indication.

2. The air-conditioning apparatus of claim 1, wherein the information outputting unit includes a sound producing unit, producing a sound, and
 the information adjustment unit includes a sound adjustment unit, causing the sound producing unit to produce (i) a first sound responsive to the adapter receiving the remote information, and (ii) a second sound different from the first sound responsive to the receiving unit receiving the remote control information.

3. The air-conditioning apparatus of claim 1, wherein the information outputting unit includes a display unit, and
 the information adjustment unit includes a display adjustment unit, causing the display unit to provide (i) a first indication responsive to the adapter receiving the remote information and (ii) a second indication responsive to the receiving unit receives the remote control information.

4. The air-conditioning apparatus of claim 1, wherein the controller further includes a display adjustment unit, determining whether the information outputting unit is to be caused to output the information on a basis of the operation details in the remote information.

5. The air-conditioning apparatus of claim 4, wherein the display adjustment unit, prohibiting the information adjustment unit from causing the information outputting unit to output the information when the operation details in the remote information indicate an automatic operation automatically controlled by a centralized controller.

6. The air-conditioning apparatus of claim 1, wherein the controller further includes a time determination unit, determining whether the information outputting unit is to be caused to output the information on a basis of a time of receipt of the remote information by the adapter.

7. The air-conditioning apparatus of claim 6, wherein the time determination unit, prohibiting the information adjustment unit from causing the information outputting unit to output the information when the time of receipt of the remote information by the adapter is in a predetermined time period.

8. The air-conditioning apparatus of claim 1, wherein the controller is further configured to include
   an operation instruction outputting unit, causing a movable part of the air-conditioning apparatus to operate, and
   a storage unit, storing control setting values and programs which the controller reads from the storage unit and transmits to the information adjustment unit or the operation instruction outputting unit.

9. The air-conditioning apparatus of claim 1, wherein the controller is further configured to
   cause the output by the information outputting unit that indicates whether the manipulation is received via the external network or through the remote control device, and then
   control the air-conditioning apparatus to operate based on the operation details which were received for the manipulation of the air-conditioning apparatus.

10. The air-conditioning apparatus of claim 1, wherein the controller is further configured to
   responsive to determining that the operation details are from the remote information through the adapter,
      determine whether sounding of a distant reception sound is allowed based on a time of receipt of the remote information by the adapter,
         emit the distant reception sound, indicating that a remote manipulation instruction is issued through the external network, responsive to determining that sounding is allowed,
         prohibit the distant reception sound responsive to determining that sounding is prohibited,
   responsive to determining that the operation details are from the remote control information received from the remote control,
      emit a remote control reception sound, indicating that the manipulation instruction is issued using the remote control device.

11. The air-conditioning apparatus of claim 10, wherein the controller further comprises a sounding allow-prohibition table that indicates, based on predetermined time-of-day, whether the sounding of the distant reception sound is prohibited,
the controller further determining whether sounding of the distant reception sound is allowed based on the time of receipt of the remote information and the sounding allow-prohibition table.

* * * * *